US009426411B2

(12) United States Patent
Jung

(10) Patent No.: US 9,426,411 B2
(45) Date of Patent: Aug. 23, 2016

(54) METHOD AND APPARATUS FOR GENERATING SUMMARIZED INFORMATION, AND SERVER FOR THE SAME

(71) Applicant: Electronics and Telecommunications Research Institute, Daejeon (KR)

(72) Inventor: Ho Young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 353 days.

(21) Appl. No.: 13/850,646

(22) Filed: Mar. 26, 2013

(65) Prior Publication Data

US 2014/0132836 A1    May 15, 2014

(30) Foreign Application Priority Data

Nov. 12, 2012  (KR) .................. 10-2012-0127225

(51) Int. Cl.
  H04N 21/00   (2011.01)
  H04N 7/00   (2011.01)
  H04N 21/233  (2011.01)
  H04N 21/242  (2011.01)
  H04N 21/845  (2011.01)
  H04N 21/8549  (2011.01)

(52) U.S. Cl.
  CPC ............. H04N 7/007 (2013.01); H04N 21/233 (2013.01); H04N 21/242 (2013.01); H04N 21/8456 (2013.01); H04N 21/8549 (2013.01)

(58) Field of Classification Search
  CPC  H04N 21/233; H04N 21/242; H04N 21/8456
  See application file for complete search history.

(56) References Cited

U.S. PATENT DOCUMENTS

| 2002/0070958 | A1* | 6/2002 | Yeo et al. ...................... 345/723 |
| 2002/0083471 | A1* | 6/2002 | Agnihotri et al. ............. 725/137 |
| 2002/0083473 | A1* | 6/2002 | Agnihotri et al. ............. 725/140 |
| 2003/0038796 | A1* | 2/2003 | van Beek et al. ............. 345/418 |
| 2011/0267544 | A1 | 11/2011 | Mei et al. |
| 2012/0106925 | A1 | 5/2012 | Dirik et al. |

FOREIGN PATENT DOCUMENTS

| JP | 2010-34953 | 2/2010 |
| KR | 10-0547370 | 1/2006 |
| KR | 10-2007-0118635 | 12/2007 |

* cited by examiner

*Primary Examiner* — Stephen Hong
*Assistant Examiner* — Marshon Robinson
(74) *Attorney, Agent, or Firm* — Nelson Mullins Riley & Scarborough LLP; Anthony A. Laurentano

(57) ABSTRACT

The present invention relates to automatic summarization so as to recognize entire contents of multimedia data. A method of generating summarized information according to the present invention includes: generating index information on a specific audio signal or a specific video signal among input signals; synchronizing text information extracted from the input signal or received for the input signal with the index information; and generating first summarized information by using the synchronized text information and index information.

11 Claims, 4 Drawing Sheets

METHOD AND APPARATUS FOR GENERATING SUMMARIZED INFORMATION, AND SERVER FOR THE SAME

CROSS-REFERENCE TO RELATED APPLICATIONS

This application claims priority to and the benefit of Korean Patent Application No. 10-2012-0127225 filed in the Korean Intellectual Property Office on Nov. 12, 2012, the entire contents of which are incorporated herein by reference.

TECHNICAL FIELD

The present invention relates to automatic summarization so as to recognize entire contents of multimedia data.

BACKGROUND ART

A related art for extraction of a main scene of a sports game, summarization of popular music, summarization of main contents of text data includes an apparatus and a method for abstracting summarization video using shape information of an object, and video summarization and an indexing system using the same (Korean Patent Registration No. 10-0547370), which is a method of suggesting contents-based search for a video by extracting a series of changed shapes and positions of a video object in a video expressing a shape or position change of the video object by movement of a camera or movement of the object itself and representing the extracted shape and position as a single video frame, to illustrate the shape or position change of the object expressed by the video, but is summarization based on information on an object of a video signal and considered at a level of using one type of information.

SUMMARY OF THE INVENTION

The present invention has been made in an effort to provide a technology for summarizing corresponding data by synthesizing video information, context information obtained from voice recognition, audio index information, and relevant background knowledge.

An exemplary embodiment of the present invention provides a method of generating summarized information, including: generating index information on a specific audio signal or a specific video signal among input signals; synchronizing text information extracted from the input signal or received for the input signal with the index information; and generating first summarized information by using the synchronized text information and index information.

Another exemplary embodiment of the present invention provides an apparatus for generating summarized information, including: a signal interpretation unit configured to generate index information on a specific audio signal or a specific video signal among input signals; a synchronization unit configured to synchronize text information extracted from the input signal or received for the input signal with the index information; and a summarization unit configured to generate summarized information by using the synchronized text information and index information.

Yet another exemplary embodiment of the present invention provides a server for generating summarized information, including: a signal interpretation unit configured to generate index information on a specific audio signal or a specific video signal among input signals; a synchronization unit configured to synchronize text information extracted from the input signal or received for the input signal with the index information; a summarization unit configured to generate summarized information by using the synchronized text information and index information; a communication unit configured to receive the input signal from a content providing server, and transmit the summarized information to the content providing server; and a control unit configured to control the signal interpretation unit, the synchronization unit, the summarization unit, and the communication unit.

According to the present invention, a summary of multimedia data is automatically generated so as to enable a user to select a video product that is more appropriate to a viewer's intention after searching for a video product of a desired genre, to recognize game contents within a short time when the user has no time to watch entire contents of a sports game, to experience music to be purchased in advance, thereby improving the user's convenience.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
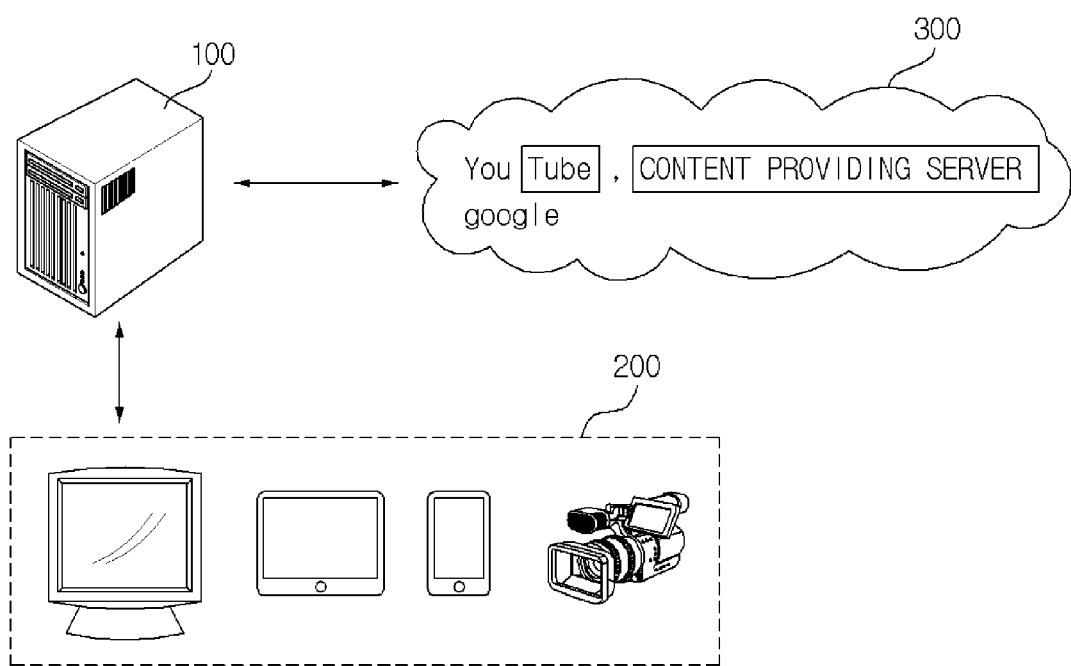
FIG. 1 is a diagram illustrating a configuration of a summarized information generating system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

Contents below are simple examples of a principle of the invention. Accordingly, a person skilled in the art may implement the principle of the invention and invent various apparatuses included in a concept and a scope of the invention although it is not clearly described or illustrated in the present specification. All conditional terms and exemplary embodiments enumerated in the present specification have a clear intention only for the purpose of understanding the concept of the invention in principle, and shall not be understood that the conditional terms and exemplary embodiments are limited to the specially enumerated exemplary embodiments and state.

The aforementioned objects, characteristics, and advantages will be more apparent through the detailed description below related to the accompanying drawings, and thus those skilled in the art to which the present invention pertains will easily implement the technical spirit of the present invention. In the following description, a detailed explanation of known related functions and constitutions may be omitted so as to avoid unnecessarily obscuring the subject matter of the present invention. Hereinafter, exemplary embodiments according to the present invention will be described in detail with reference to the accompanying drawings.

FIG. 1 is a diagram illustrating an entire configuration of a summarized information generating system according to an exemplary embodiment of the present invention.

Referring to FIG. 1, the summarized information generating system according to the exemplary embodiment of the present invention includes a summarized information generating server 100, a user terminal 200, and a content providing server 300.

The summarized information generating server 100 receives contents through the user terminal 200 and generates a summary as summarized information on the input contents by using a multimedia summarizing technology, and distributes the generated summary to the content providing server 300, such as a media sharing server, such as YouTube, a portal site, or various pay content sites. The summarized information generating server 100 may directly receive contents from the content providing server 300, generate summary for the received contents, and provide the content providing server 300 with the generated summary again.

A distribution company or an individual producer who desires to generate and promote a summary of possessed contents may register the contents in the content providing server 300, generate the summary through the summarized information generating server 100, and publish the generated summary or distribute the generated summary to various sites for promotion. The summarized information generating server 100 may manage distribution of original contents through a generated summary in association with a pay content provider.

The user terminal 200 is a device for directly transmitting contents desired to be summarized by a user to the summarized information generating server 100 and receiving a summary as summarized information on the contents, and includes a PC, a smart phone, a table PC, a digital camera, and a camcorder of a user, and the like.

Accordingly, the summarized information generating server 100 in the present exemplary embodiment may directly receive personal contents produced by a user, or receive personal contents from the content providing server 300 of a video sharing service vendor, such as YouTube, in addition to contents produced through public media, such as movies, dramas, and music, and generate summarized information on the received contents.

Hereinafter, referring to FIG. 2, the summarized information generating server 100 according to the present exemplary embodiment will be described in more detail.

Figure 2:
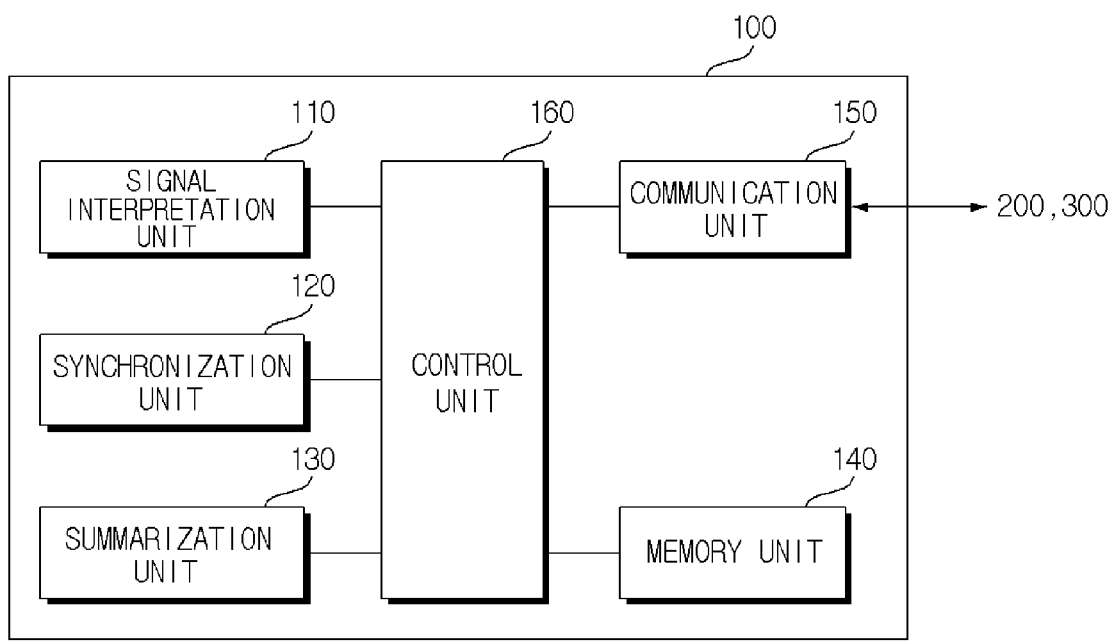
FIG. 2 is a block diagram illustrating a configuration of a summarized information generating apparatus according to an exemplary embodiment of the present invention.

Referring to FIG. 2, the summarized information generating server 100 may include a signal interpretation unit 110, a synchronization unit 120, a summarization unit 130, a memory unit 140, a communication unit 150, and a control unit 160.

The signal interpretation unit 110 generates index information for a specific audio signal or a specific video signal among input signals.

The synchronization unit 120 synchronizes text information extracted from the input signal or received for the input signal with the index information.

The summarization unit 130 generates first summarized information by using the synchronized text information and index information, and further generates second summarized information by using additional information existing on a web for the input signal and the first summarized information.

The memory unit 140 stores predetermined text pattern information in order to extract main text information.

The communication unit 150 receives the input signal from the content providing server 300, and transmits the summarized information to the content providing server 300.

The control unit 160 controls the signal interpretation unit 110, the synchronization unit 120, the summarization unit 130, and the communication unit 150.

The communication unit 150 among the aforementioned constituent elements according to the present exemplary embodiment is a configuration for transmitting/receiving information between a server and another content providing server 300 or the user terminal 200 when a summarized information generating method is implemented through the server.

When the summarized information generating apparatus is implemented through an internal module of the user terminal 200, the communication unit 150 performs an operation for transmitting/receiving information between the user terminal 200 and the content providing server 300. In this case, the communication unit 150 receives contents information desired to be summarized from the content providing server 300 as the input signal, and transmits the generated summarized information generated through the summarization unit 130 to the content providing server.

A summarized information generating method through the respective constituent elements of the aforementioned summarized information generating server 100 according to the present exemplary embodiment will be described in more detail with reference to FIGS. 3 to 5.

Figure 3:
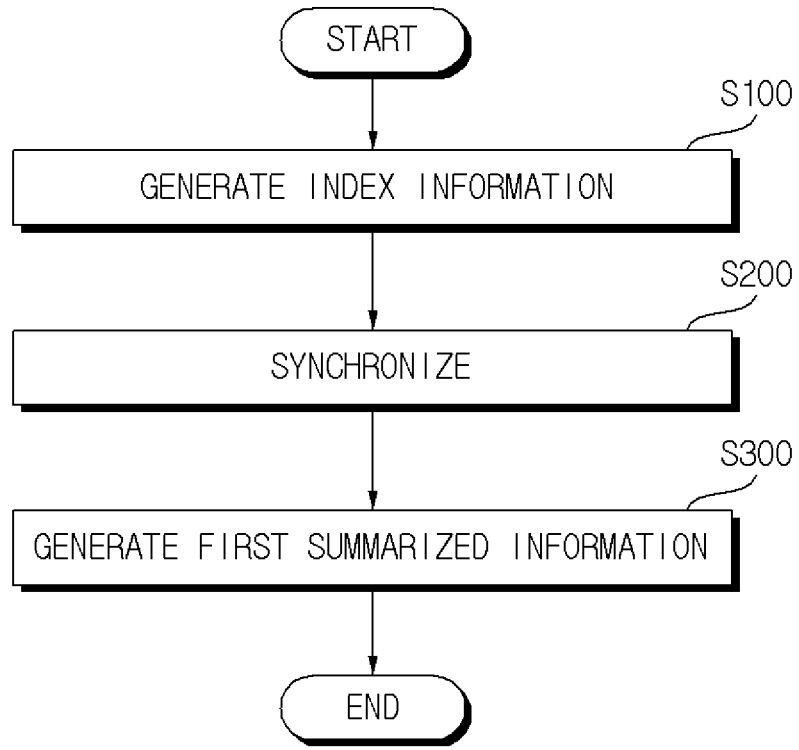
FIG. 3 is a flowchart illustrating a summarized information generating method according to an exemplary embodiment of the present invention.

Referring to FIG. 3, the summarized information generating method by the summarized information generating server 100 according to the present exemplary embodiment includes an index information generating step S100, a synchronization step S200, and a first summarized information generating step S300.

In the index information generating step S100, the signal interpretation unit 110 generates index information for a specific audio signal or a specific video signal among input signals. Referring to FIG. 5, the index information generating step S100 includes a signal inputting step S105, an audio/video signal separating step S110, an audio index information generating step S120, a video index information generating step S120', a voice recognizing step S130, and a text information inputting step S140.

In the signal inputting step S105, the signal interpretation unit 110 receives a signal for contents, which are desired to be summarized, received by the communication unit 150.

In audio/video signal separating step S110, the signal interpretation unit 110 first separates an input signal for video contents, such as a movie and a drama, to an audio signal and a video signal according to a type of the input signal.

The summarized information generating method according to the present exemplary embodiment synchronizes the index information generated in the index information generating step S100 and text information extracted from the input signal or received for the input signal in the synchronization step S200 to be described below. Accordingly, in the text information inputting step, audio index information for an audio signal and a script in a case where there is the script, are received as the text information received for the input signal.

In a case where there is no script, in the voice recognizing step according to the present exemplary embodiment, voice recognition for the separated audio signal is performed, and in the text information inputting step, text information is extracted and received.

In the audio index information generating step S120 in the present exemplary embodiment, the audio is divided into voice and non-voice, and various background sound existing in a non-voice section or sound crucially affecting a topic of image product is extracted by using an audio indexing technology.

For a voice section, text information is extracted by employing voice recognition in the aforementioned voice recognizing step S130.

In the video index information generating step S120', a part having many scene changes is chosen from the separated video signal, and a scene appropriate to the topic of the image product is extracted.

In the audio and video index information generating step S100 in the present exemplary embodiment, the topic of the image product may be determined according to a type of image product. For example, in a case where the image product is for the purpose of entertainment, such as a movie, the topic may be determined through synopsis of the movie, and in a case where the image product is a sports game, a scoring scene may be determined as the topic.

In a case where the image product is a movie, a detailed topic may be determined according to a genre, and in a case where the image product is a sports game, a detailed topic may be determined according to an event of the sports game.

In the audio index information generating step S120, the audio is divided into voice and non-voice through audio interpretation, and background sound, such as a cheer sound, existing in the non-voice section, or frequently present sound according to a type of corresponding sports is extracted. For the voice section, text information spoken by a cast or a commentator is extracted by applying the voice recognition.

In the video index information generating step S120', a part having many scene changes is chosen through the video interpretation, and a background scene which is significantly considered according to the type of sports is extracted.

In the synchronization step S200, the synchronization unit 120 synchronizes text information extracted from the input signal or received for the input signal with the index information. The synchronization step S200 means alignment of the extracted index information and text information by matching the extracted index information and text information.

Figure 5:
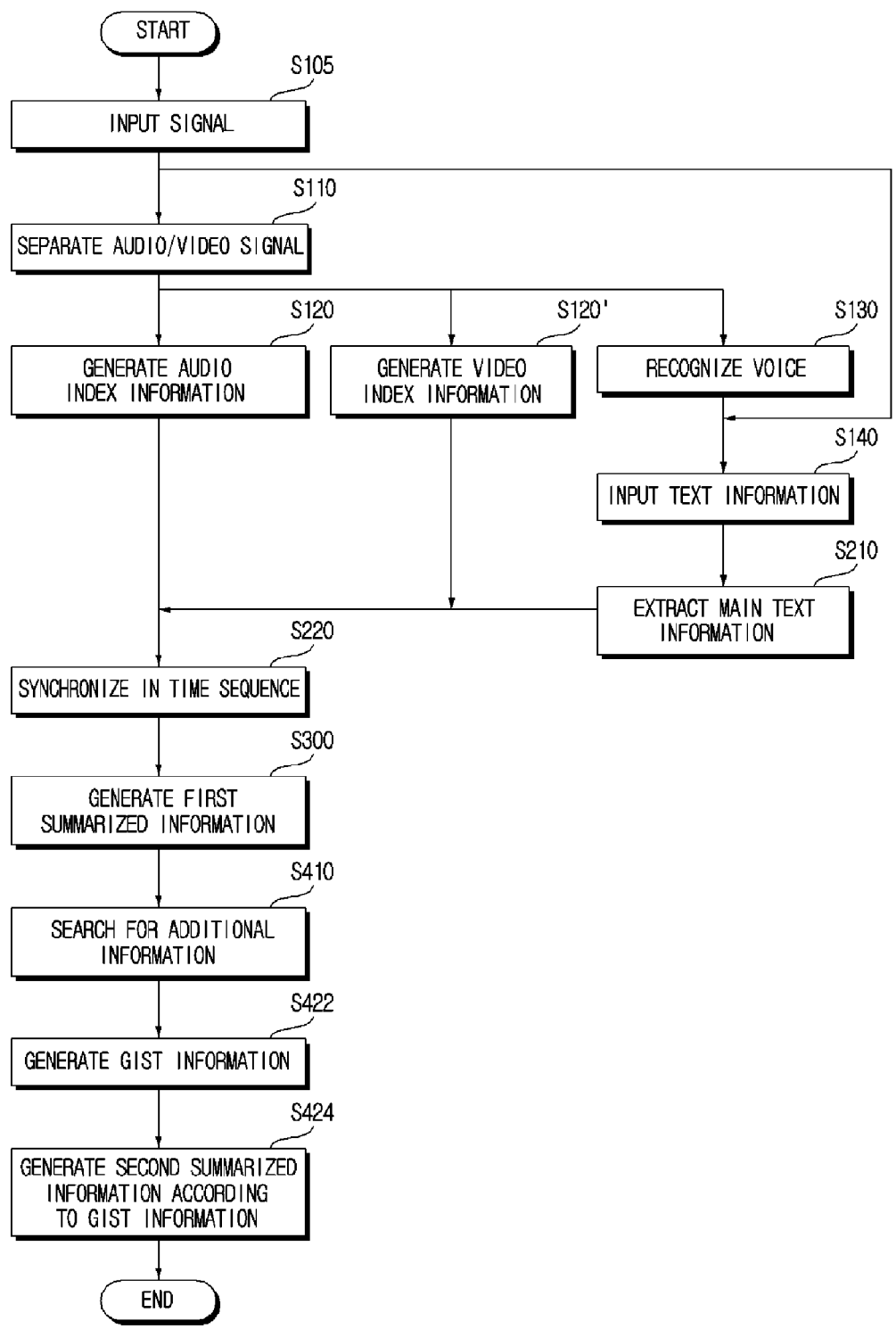
FIG. 5 is a detailed flowchart illustrating a summarized information generating method according to an exemplary embodiment of the present invention.

Referring to FIG. 5, the synchronization step S200 according to the present exemplary embodiment includes a main text information extracting step S210 and a time-sequence synchronizing step S220. In the main text information extraction step S210, main text information of the input signal is extracted by using the text information.

In the main text information extraction step S210, a topic is detected by using the text information obtained from a script or through the voice recognition, and an important synopsis appropriate to the topic is extracted as main text information among the text information by applying a topic tracking technology.

In a case where an image product is a sports game, in the main text information extraction step S210, a meaning of contents spoken by a commentator is analyzed by using the text information obtained through the voice recognition and a part in which a previously prepared main text pattern for each sport game frequently appears is extracted, so that a synopsis representing a game flow is generated.

Accordingly, the summarized information generating server 100 according to the present exemplary embodiment may further include the memory unit for storing and managing information on a text pattern for extraction of the main text information.

In the time-sequence synchronization step S220, when the audio interpretation and the video interpretation are completed, the extracted audio index information, video scene information, and text information on the main part are aligned so that timing synchronization is matched. Hereinafter, the step of generating the summarized information according to the present exemplary embodiment will be described.

The summarized information generating method according to the present exemplary embodiment includes two steps of determining a main part for summarization by synthesizing voice, image, and audio information obtainable from multimedia data and extracting context information, main scene change, main background audio, and the like, and generating a story for interesting summarization after obtaining background knowledge of the corresponding multimedia data after searching through the Internet, and introducing the determined main part into the generated story to generate final summarization.

Figure 4:
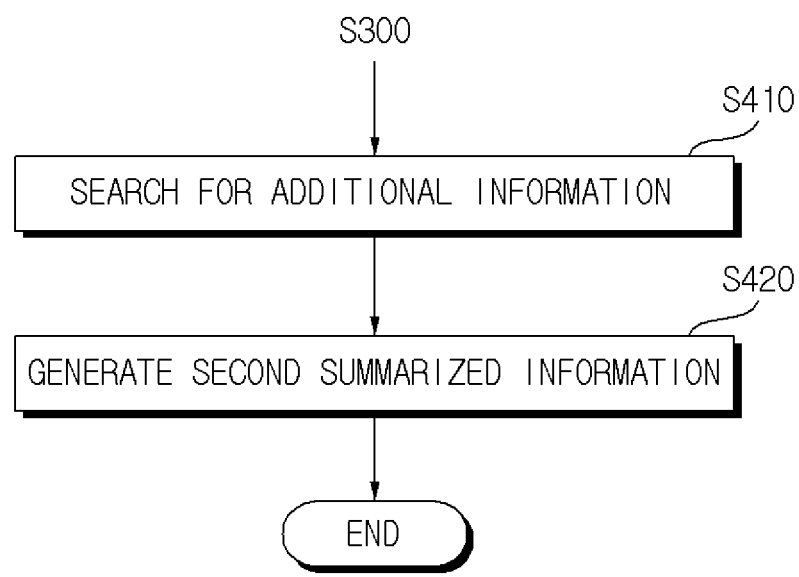
FIG. 4 is a flowchart illustrating the summarized information generating method including a second summarized information generating step according to an exemplary embodiment of the present invention.

Accordingly, referring to FIGS. 3 and 4, the summarized information generating step includes the first summarized information generating step S300 and the second summarized information generating step S420.

In first summarized information generating step S300, the summarization unit 130 generates first summarized information by using the synchronized text information and index information.

In the second summarized information generating step S420, the summarization unit 130 generates second summarized information by using additional information existing on a web for the input signal and the first summarized information.

In the first summarized information generating step, the first summarized information is generated by combining the synopsis obtained through language processing for the index information and the text information extracted from the video/audio with information organized according to a time and analyzing the combined synopsis and information.

Referring to FIG. 4, the summarized information generating method according to the present exemplary embodiment may further include an additional information searching step S410.

In the additional information searching step S410, additional information existing on the web for the input signal is searched. That is, the additional information in the present exemplary embodiment means background knowledge extracted through the web search for the input signal. For example, in a case where the input signal is related to a movie, information on a main character of the movie may be recognized through the search, and in this case, the main text information may be extracted based on lines of the main character when the main text information is extracted.

In a case where the input signal is related to a sports game, an article of the sports game may be searched as the additional information, and information on a key player of today's game present in the article may be extracted. Accordingly, mention of the commentator for the key player may be voice-recognized, and the voice-recognized mention may be extracted as the main text information.

Referring to FIG. 5, the second summarized information generating step S420 may further include a gist information generating step S422.

In the gist information generating step S422, gist information according to a time sequence for the input signal is generated by using the additional information and the first summarized information.

The gist information in the present exemplary embodiment means an implicative story of the image product generated by using the first summarized information and the background knowledge.

In the second summarized information generating step S424 according to the gist information, the second summarized information according to the gist information is generated. That is, higher dimensional summarized information is generated by applying the additional information extracted through the web search to the first summarized information, removing unnecessary information, and emphasizing information close to the topic.

The aforementioned summarized information generating method may further include a contents classification step for classifying contents information of the input signal. In the contents classification step, the input signal is classified into a type of image product, sports game, and music by fetching the input signal that is a target of the summarization.

In this case, tag information attached to each data may be used, and the image product contains tag information related to a topic, such as action, drama, thriller, and amusement, and the sports game contains tag information on an event of a game, such as soccer, baseball, and basket ball. When the type of corresponding multimedia data is determined, a method of generating more detailed summarized information for each type is performed.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of generating summarized information, comprising:
   generating index information on a specific audio signal or a specific video signal among input signals;
   synchronizing text information extracted from the input signal or received for the input signal with the index information;
   generating first summarized information by using the synchronized text information and index information; and
   generating second summarized information by using additional information existing on a web for the input signal and the first summarized information,
   wherein the generating index information comprises;
      separating an input signal into an audio signal and a video signal according to a type of input signal;
      separating the audio signal into a voice signal and a non-voice signal;
      performing voice recognition on the voice signal; and
      extracting the text information based on an output of the voice recognition,
   wherein the synchronizing comprises;
      extracting main text information on the input signal by using the text information; and
      synchronizing the main text information with the index information according to a time sequence, and
   wherein the non-voice signal is based on a topic and the main text information is extracted by using a predetermined topic detection method.

2. The method of claim 1, wherein the generating of the second summarized information comprises generating implicative information on the input signal by using the additional information and the first summarized information and generating the second summarized information according to the implicative information.

3. The method of claim 2, wherein the generating of the second summarized information comprises generating time sequential implicative information on the input signal by using the additional information and the first summarized information and generating the second summarized information according to the implicative information.

4. An apparatus for generating summarized information, comprising:
   a signal interpretation unit configured to generate index information on a specific audio signal or a specific video signal among input signals;
   a synchronization unit configured to synchronize text information extracted from the input signal or received for the input signal with the index information; and a summarization unit configured to generate first summarized information by using the synchronized text information and index information and generate second summarized information by using additional information existing on a web for the input signal and the first summarized information, wherein the signal interpretation unit
- separates an input signal into an audio signal and a video signal according to a type of input signal,
- separates the audio signal into a voice signal and a non-voice signal, performs voice recognition on the voice signal, and
- extracts the text information based on an output of the voice recognition, wherein the synchronization unit
- extracts main text information on the input signal by using the text information, and
- synchronizes the main text information with the index information according to a time sequence, and wherein the non-voice signal is based on a topic and the main text information is extracted by using a predetermined topic detection method.

5. The apparatus of claim 4, wherein the second summarization unit generates implicative information on the input signal by using the additional information and the first summarized information and generates the second summarized information according to the implicative information.

6. The apparatus of claim 5, wherein the second summarization unit generates time sequential implicative information on the input signal by using the additional information and the first summarized information and generates the second summarized information according to the implicative information.

7. The apparatus of claim 4, further comprising:
a memory unit configured to store predetermined text pattern information in order to extract the main text information.

8. A server for generating summarized information, comprising:
- a signal interpretation unit configured to generate index information on a specific audio signal or a specific video signal among input signals;
- a synchronization unit configured to synchronize text information extracted from the input signal or received for the input signal with the index information;
- a summarization unit configured to generate first summarized information by using the synchronized text information and index information and generate second summarized information by using additional information existing on a web for the input signal and the first summarized information;
- a communication unit configured to receive the input signal from a content providing server, and transmit the summarized information to the content providing server; and
- a control unit configured to control the signal interpretation unit, the synchronization unit, the summarization unit, and the communication unit, wherein the signal interpretation unit
- separates an input signal into an audio signal and a video signal according to a type of input signal,
- separates the audio signal into a voice signal and a non-voice signal, performs voice recognition on the voice signal, and
- extracts the text information based on an output of the voice recognition, wherein the synchronization unit
- extracts main text information on the input signal by using the text information, and
- synchronizes the main text information with the index information according to a time sequence, wherein the non-voice signal is based on a topic and the main text information is extracted by using a predetermined topic detection method.

9. The server of claim 8, wherein the second summarization unit generates implicative information on the input signal by using the additional information and the first summarized information and generates the second summarized information according to the implicative information.

10. The server of claim 9, wherein the second summarization unit generates time sequential implicative information on the input signal by using the additional information and the first summarized information and generates the second summarized information according to the implicative information.

11. The server of claim 8, further comprising:
a memory unit configured to store predetermined text pattern information in order to extract the main text information.

* * * * *